INVENTORS
James W. Casten
BY Stanley H. Shimabuku

Attorneys

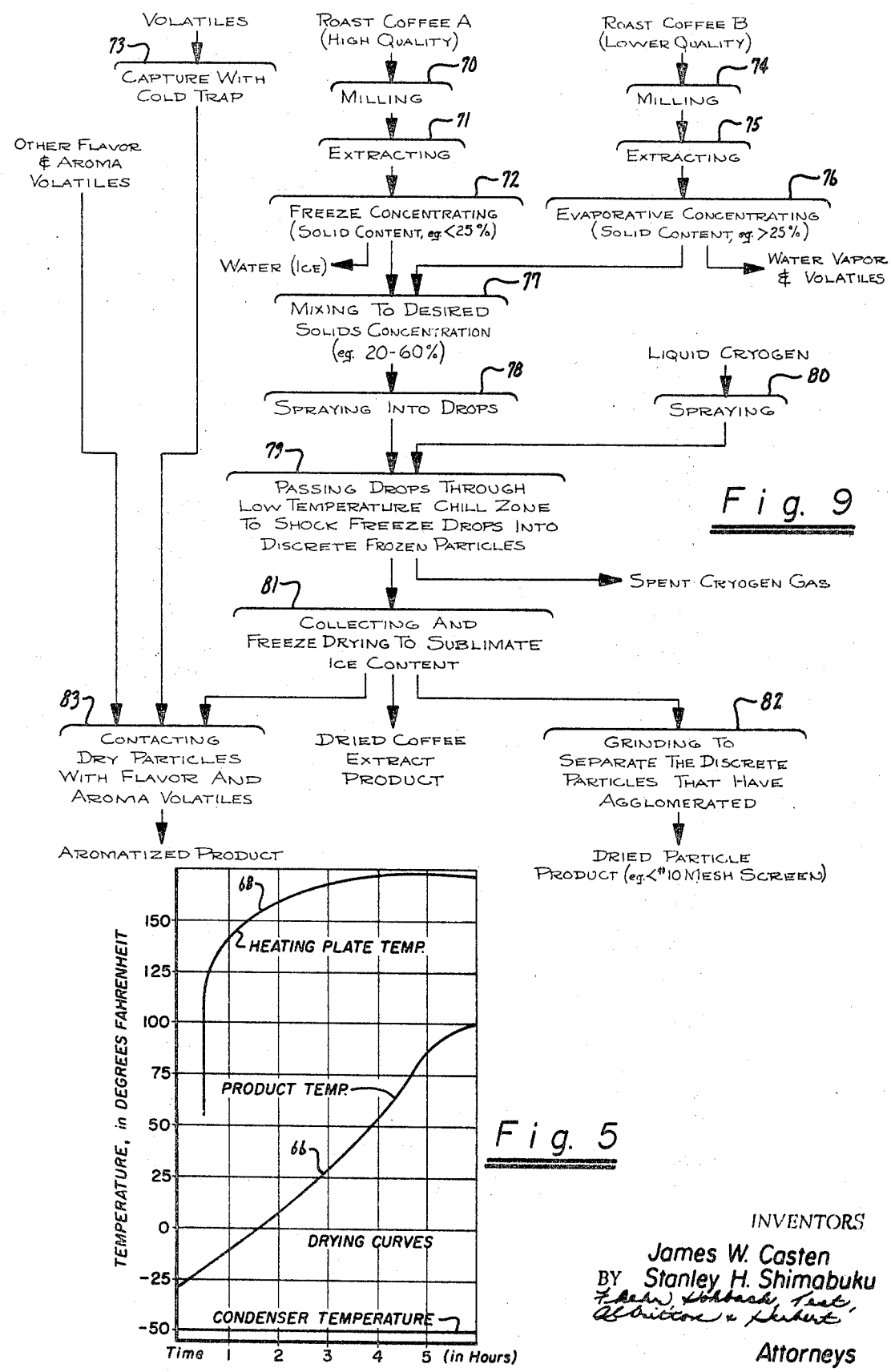

INVENTOR.
James W. Casten
Stanley H. Shimabuku
Attorneys

INVENTORS
James W. Casten
Stanley H. Shimabuku
Attorneys

INVENTORS
James W. Casten
BY Stanley H. Shimabuku

Attorneys

United States Patent Office 3,573,060
Patented Mar. 30, 1971

3,573,060
COFFEE EXTRACT PRODUCTS AND METHODS
AND APPARATUS FOR THEIR MANUFACTURE
James W. Casten, Piedmont, and Stanley H. Shimabuku,
Richmond, Calif., assignors to Hills Bros. Coffee, Inc.,
San Francisco, Calif.
Filed Sept. 21, 1967, Ser. No. 669,618
Int. Cl. A23f 1/08
U.S. Cl. 99—71          7 Claims

ABSTRACT OF THE DISCLOSURE

The coffee extract concentrate to be freeze dried is sprayed to form drops. A method and apparatus are disclosed in which a cryogen gas is sprayed into a region to create a low temperature zone for freezing the drops. The latter are caused to impinge and pass through the zone so that they are instantly shock frozen into discrete solid frozen particles. The particles are collected and freeze dried in suitable apparatus to sublimate their ice content and form a dried particle product. The dried coffee particle product is characterized by a low bulk denstiy of about 0.20 to 0.25 gram per cubic centimeter and by having a granular form, of sponge-like appearance, and being highly porous and easily aromatized. A process is disclosed for using combined freeze concentrated and evaporation concentrated coffee extracts.

BACKGROUND OF THE INVENTION

This invention relates to freeze dried coffee extract products and to methods and apparatus for their manufacture. More particularly, the invention relates to high quality instant coffee products which have low bulk density, which are free flowing and readily dispersed in hot or cold water, and to methods and apparatus for their manufacture.

Freeze drying processes, involving sublimation of the moisture content of frozen liquid concentrates, have been known for some time. Generally, the quality of freeze dried products is higher than that of products dried by other methods, but, freeze dried products have yet to possess entirely satisfactory properties. In general, freeze dried coffee products have consisted of broken fragments derived from slab frozen concentrate having an unfavorably high bulk density that inhibits dispersion in water so that it is inconvenient for the consumer to reconstitute the coffee beverage. Furthermore, the product quality in general has not been satisfactory. Principally, this results from limitations in the solids concentration of the coffee extract concentrate feed to the freeze drying system. The solids concentration of this feed has heretofore been limited to about 25%, above which the finished product has a bulk density above acceptable limits. The need to remove this high water content in the freeze dryer impairs the quality of the resulting product since excessive flavor and aroma volatiles are also lost in extended sublimation, usually under vacuum. Furthermore, the cost of removing this high water content is a substantial contribution to the overall costs of the operation. There is, therefore, a need for new and improved methods and apparatus for producing an improved freeze-dried coffee extract.

OBJECTS AND SUMMARY OF THE INVENTION

It is a general object of the present invention to provide new and improved freeze-dried extracts of coffee and methods and apparatus for their production which will overcome the above mentioned limitations and disadvantages.

It is another object of the present invention to provide a dry, discrete coffee extract product of low bulk density having free flow characteristics and high wetability so as to be readily dispersible in hot or cold water to reconstitute coffee beverage.

It is a further object of the invention to provide a high quality coffee extract product of the above character which combines good aroma and flavor characteristics with the above mentioned desirable physical properties. Particularly, it is an object of the invention to provide a product which has enhanced sorption for aromas to facilitate aromatizing the same.

As applied to the manufacture of products consisting mainly of coffee extract solids, the method consists of preparing a concentrated coffee extract by any suitable method such as freeze concentration or evaporative concentration or combination thereof. The coffee concentrate is then instantly or shock frozen by being discharged from a spray nozzle into drops which are passed upon low temperature zone created by a surrounding spray of liquid cryogen gas. The last step is preferably carried out in a free falling system at atmospheric pressure. The particles of frozen drops fall under gravity and are collected after which they are freeze-dried to remove the moisture content by sublimation. The disclosed apparatus is especially adapted to carry out the foregoing steps. The resulting product may be used as the final product or may be further processed by aromatizing the same.

It has been discovered that the shock freezing of drops of the concentrate with a cryogen permits a high solids concentration in the feed, and directly leads to a high quality novel coffee extract product having low bulk density, and a particular affinity for sorption of aroma and flavor volatiles. This product has highly desirable physical properties including a packed bulk density of about .20 to .25 gram per cubic centimeter. The product is characterized by being in sponge-like or porous particles appearing to be substantially non-crystalline or of crystalline nature with extremely small crystals. The frozen material leaves the spray-free system as discrete particles. The characteristics of the dryer determine whether the particles remain discrete during the drying cycle, but any agglomerates formed during drying are easily broken down by grinding and screening. The dried coffee extract product is free flowing, being easy to pour under a wide variety of conditions, and it does not tend to agglomerate or to dust.

The product is characterized by high wetability and rapid dispersibility in cold or hot water. The appearance of the coffee extract product is particularly appetizing and appealing since the color can be controlled to resemble freshly ground roast coffee. This good coloration when combined with the desirable physical properties and high quality leads to product characteristics which are particularly suitable in an instant coffee product.

The above and other features of the invention will more fully appear from the following description in which the preferred embodiments have been set forth in detail in conjunction with the accompanying drawings.

BRIEF DESCRIPTION OF THE DRAWINGS

FIG. 5 is a graph showing curves of the temperature versus time for the drying operation of the apparatus of FIGS. 2 through 4.

FIG. 9 is an amplified flow sheet illustrating a commercial method for preparing an instant coffee product using a combination of different coffee extract concentrates in accordance with the present invention.

Figure 1:
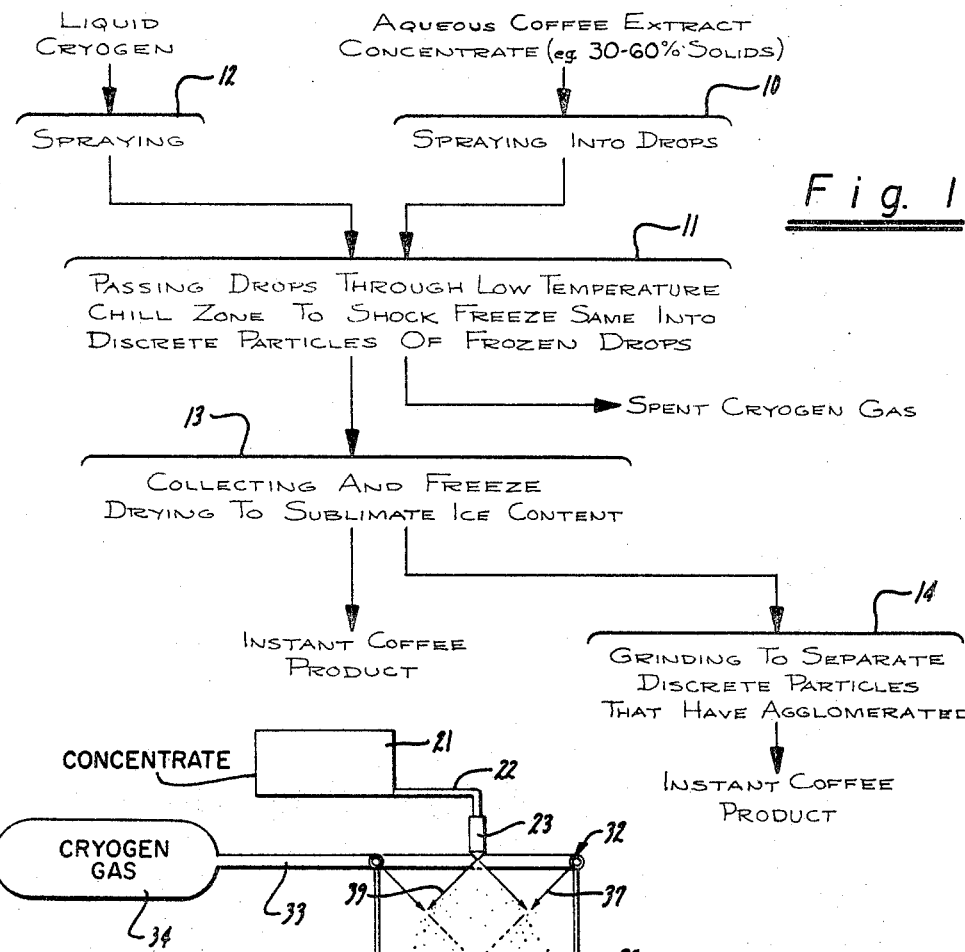
FIG. 1 is a flow sheet illustrating the general steps of the method of the present invention as applied to the preparation of a dried coffee extract product from a concentrate.

The steps of the method are illustrated with particular reference to FIG. 1 and consists in supplying an aqueous concentrate containing extract of coffee to a spraying operation 10 wherein it is subdivided into drops or droplets. Preferably this is accomplished so that drops are permitted to freely fall under the influence of gravity and pass in step 11 into a low temperature zone where they are instantly shock frozen. The solids concentration preferably lies in the range from about 20% to 60%.

The low temperature zone is preferably created in step 12 by spraying a plurality of streams or curtain of liquid cryogen through the zone at atmospheric pressure so that it vaporizes as it instantly chills any concentrate drops passing through the zone.

The cryogen supplied to the low temperature zone in step 11 may be of any suitable type which does not degrade the quality of the resultant product or react with the product in an adverse manner. Examples of suitable cryogens include liquid nitrogen and liquid air. Preferably, liquid nitrogen is utilized because of its satisfactory properties, including inertness, and relatively low cost.

The frozen particles are collected in step 13 and subjected to freeze drying so that the ice content thereof is sublimated and the dried product formed. The product obtained has a granular shape and a sponge or lava-like structure, being highly porous, and has a packed bulk density less than about .25 gram/cc. at a moisture content of less than about 3%.

The drying step can be carried out with either batch or continuous type freeze drying apparatus. When batch type apparatus is used the discrete particles formed in the spray freezing step tend to agglomerate but can easily be ground and screened in step 14 to produce a coffee extract product of appropriate size, preferably to a size less than that which will pass a #10 mesh screen. When using continuous type freeze-drying apparatus in which the particles are agitated by a vibrating conveyor system as they pass through the drying apparatus, the particles will tend to retain their discrete character and will require little or no grinding. In either case, the general state of subdivision of the shock spray-frozen and dried particles is such that the resultant product attains the desired bulk density and size without the necessity for deliberate size enlargement.

Referring to the equipment illustrated in FIGS. 2 through 5, the concentrate is supplied to a suitable feed tank 21 which is kept under the desired feed pressure by suitable means (not shown). The output of the tank is connected by piping to a sprayer 23 which is suitably supported over the center of a hopper 25 so its spray is directed downwardly and centrally within the hopper 25.

The concentrate sprayer 23 can be of any suitable type which will provide a hollow cone spray pattern. One suitable type is illustrated in detail in FIG. 3 and consists of a cylindrial shell 27 which is connected to the input piping 22 from the concentrate feed tank and which carried a spraying nozzle 29 at its other end. A suitable filter 31 is mounted at the upper end of nozzle 29 and serves to prevent clogging from any particulate matter which may exist in the concentrate feed. The spray characteristics are such that a hollow conical spray pattern having a uniform distribution is created and flairs outwardly at an angle of about 90 degrees. Means is provided for forming a cone of liquid cryogen which surrounds and intercepts the concentrate spray after it has broken into drops.

Such means consists of a circular spraying device formed of an annular ring sprayer 32 which is connected through suitable piping 33 to a source 34 of liquid cryogen under pressure, as for example liquid nitrogen at 22 p.s.i.g. Ring sprayer 32 is provided with a plurality of spaced outlet orifices 36 therein which are directed downwardly at an angle of approximately 45 degrees to the ring so that a conical cryogen spray having an apex angle of about 90 degrees is formed. A satisfactory size for orifices 36 for use with nitrogen is about 0.04 inch diameter.

It will be seen that the concentrate spray impinges the nitrogen stream midway between the point of ejection from the ring sprayer 32 and the apex thereof. This arrangement has been found particularly effective because further entry of the nozzle 29 into the cone of liquid cryogen freezes it up, while less entry causes concentrate to freeze on the ring sprayer 32.

Figure 4:
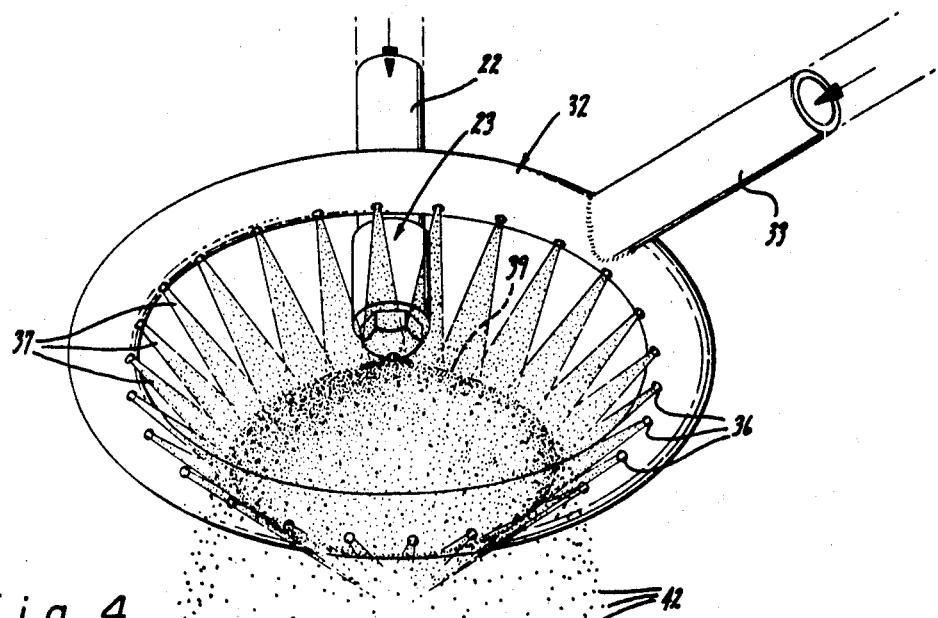
FIGS. 3 and 4 are cross sectional and perspective views respectively of the spray forming and freezing portion of the apparatus of FIG. 2.

With particular reference to FIG. 4, there is shown a diagrammatic illustration of how the converging cryogen spray 37 and diverging concentrate spray 39 interact in an annular zone 40 generally indicated by the dashed lines. In this zone the drops of liquid concentrate are instantly chilled and frozen solid by proximity to the evaporating liquid cryogen and fall out of the zone under the influence of their combined momentum and gravity as frozen discrete particles 42. After falling downwardly through hopper 25, they are collected at its conical bottom and fed to an outlet which may include a rotary feeder 44 which serves as a vacuum lock for later apparatus if such is required.

The freeze drying operation can be carried out by any of several suitable apparatus which may be of a batch operation type as generally indicated by the number 50 or may be continuous freeze-drier system 52 such as that disclosed in U.S. Pat. No. 3,293,766 which agitates the frozen particles as they pass through the system. In the following description it will be assumed that a batch type of operation is being employed. Thus, the frozen particles are collected on trays 54 which, when filled, are loaded into a drier vessel 56 which can be sealed up vacuum tight. The drier vessel includes plate coils 58 which are kept at a temperature of about 150° to 210° F. The trays 54 loaded with frozen particles 42 of coffee extract are supported on racks 60 so that the frozen particles are exposed to the radiation of the coils 58. The drier vessel 56 is connected to a condenser 62 which contains coils maintained at a temperature of, for example, −50° F. Both the condenser and drier are held to a vacuum of less than about $4 \times 10^{-1}$ torr as supplied by a vacuum pump 64. Typical drying time extends from 4 to 6 hours after which the trays are removed from the drier and allowed to return to ambient temperature. FIG. 5 illustrates drying curves obtained with the product of the present invention utilizing a batch-type drier 50 of the type illustrated. The product temperature, as a function of time, is given by the curve 66 and the heating plate temperature by curve 68.

Figure 2:
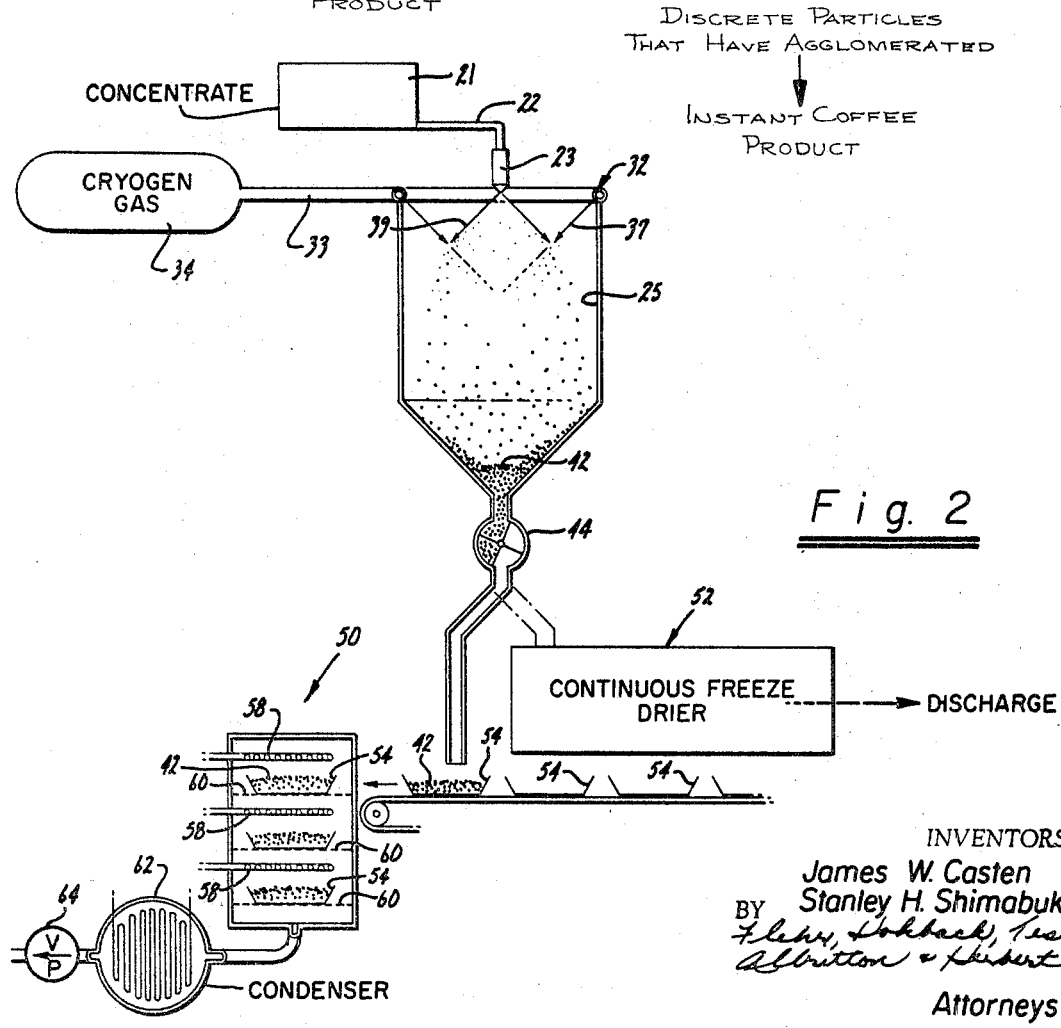
FIG. 2 is a schematic diagram showing apparatus for carrying out the method of the invention.
Figure 3:
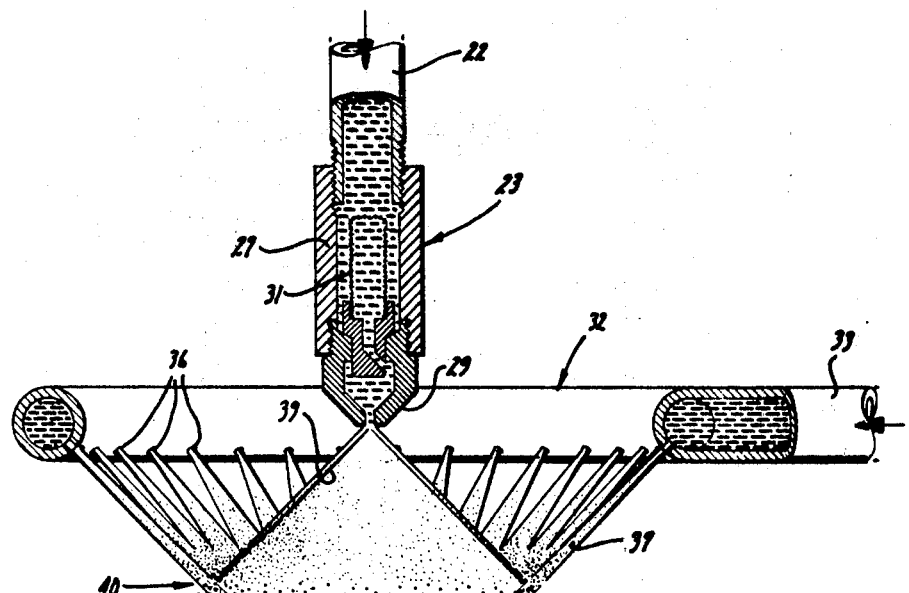

The following discussion illustrates the operation of the apparatus of FIGS. 2 through 4 according to the invention and provides specific examples of product characteristics resulting therefrom. The concentration of the coffee extract concentrate determines the size of nozzle which should be used for the instant spray freezing step prior to freeze-drying so that bulk density of from about .20 to .25 per cc. is achieved.

Coffee extract of 20% to 30% concentration is instantly spray frozen with a nozzle having a diameter of 0.136 inch. With extract concentrations of 30% to 40%, the nozzle size is reduced to 0.128 inch; and for concentration of 40 to 50% it is further reduced to 0.081 inch in diameter. Above 50% the nozzle size is reduced to about 0.06 inch.

Extract line pressures are varied from 25 to 175 p.s.i.g. to obtain the final desired product color. The line pressures are obtained by a suitable means such as variable drive motor on a type SSQ Moyno pump. Varying the line pressure influences the color of the freeze-dried coffee by spraying a varied quantity of coffee concentrate per unit time. For example, coffee extract of 30% soluble solids when pumped through a 0.081 inch diameter nozzle at 15 p.s.i.g. sprays 5 lb. extract per minute as compared to 6.7 lbs. extract at 100 p.s.i.g. This means that the cone of the cryogen which if formed by the flow of the liquid nitrogen (5 lb./min.) freezes 5 lb. extract per minute at 15 p.s.i.g. (1:1 ratio) and 6.7 lbs. of extract per minute at 100 p.s.i.g. (1.34:1 ratio). The temperature of the spray frozen extract is −27° F. at 15 p.s.i.g. and +22° F. at 100 p.s.i.g. prior to the freeze drying cycle. The freeze dried product in both instances obtains a bulk density of 0.18 gram per cubic centimeters. However, the product color differs in that at the low line pressure the Agtron reading is 10 and at the higher line pressure the Agtron reading is 29 (Agtron reading increases as product becomes darker). Carbon dioxide gas injection in the concentrate at different extract line pressures was tried and had no noticeable effect on bulk density.

The freeze-drying process conditions are as follows: Chamber pressures are maintained below $4.0 \times 10^{-1}$ torr; condenser temperature at −50° F. and plate coil temperature maintained at 200° F. to 210° F. or about 12.0–14.5 p.s.i.a. stream pressure. The drying time varies with the amount of water to be removed. At concentration of 30% solids the drying time is 6 hours, at 50% concentration the drying time is 4½ hours, etc.

The product temperature is controlled to prevent melting during sublimation period. After sublimation has ceased, the product temperature is allowed to rise to 100° F. for an hour before drying cycle is complete. See typical drying curves, FIG. 5.

The bulk density of freeze dried coffee product can be controlled to a certain extent by the selection of nozzle sizes at each particular soluble solids extract concentration. The color of the product can also be controlled by varying the extract line pressure being sprayed into the cone of the cryogen. The dried product requires minimum handling, that is to say, only the agglomerated particles are broken up prior to packaging. The particle sizes are usually less than #10 mesh and resembles roast ground coffee in unmagnified physical appearance.

The properties of the resultant products are set forth in the following Table I grouped by percentage of solids in the extract concentrate. The preferred conditions and products are indicated by letters A–E.

|   | Nozzle size, inches diameter | Sprayer nozzle pressure, p.s.i.g. | Drying time, hours. | Density of dried product, gm./cc. | Color of dried product, Agtron | Ratio extract to liquid nitrogen |
|---|---|---|---|---|---|---|
| | 20% solids: | | | | | |
| | 0.081 | 75 | 6 | 0.11 | 10 | 1:1.4 |
| | 0.0595 | 100 | 5.75 | 0.09 | 11 | 1:3.35 |
| | 0.042 | 100 | 6 | 0.08 | 5 | 1:2.5 |
| A | 0.136 | <5 | 6 | 0.20 | 12 | 1:1 |
| | 30% solids: | | | | | |
| | 0.070 | 35 | 5.5 | 0.20 | 0 | 1:1 |
| | 0.0595 | 125 | 5¼ | 0.19 | 0 | 1:3 |
| | 0.0595 | 150–175 | 5.5 | 0.196 | 0 | 1:3.2 |
| | 0.0810 | 55 | 5.75 | 0.20 | 22 | 1:1.25 |
| | 0.0810 | 15 | 5.5 | 0.22 | 29 | 1:1 |
| | 0.0810 | 25 | 5.75 | 0.20 | 0 | 1:1.5 |
| | 9.0810 | 75 | 5.25 | 0.20 | 0 | 1:8.3 |
| | 0.0810 | 125 | 5.5 | 0.20 | 14 | 2:1 |
| | 0.0810 | 100 | 5.75 | 0.20 | 10 | 1.34:1 |
| B | 0.128 | <5 | 5.75 | 0.18 | 15 | 1:1 |
| | 0.136 | <5 | 5.5 | 0.22 | 25 | 1:1 |
| | 0.081 | 100 | 5.5 | 0.21 | 5 | 1:5 |
| | 40% solids: | | | | | |
| C | 0.081 | 15 | 5 | 0.18 | 80 | 2:1 |
| | 0.070 | 15 | 5 | 0.18 | 41 | 2.5:1 |
| | 0.042 | 100 | 5 | 0.25 | 0 | 1:2.5 |
| | 0.0595 | 100 | 4.5 | 0.22 | 17 | 1:1 |
| | 50% solids: | | | | | |
| D | 0.081 | 25 | 4¼ | 0.21 | 47 | 1.7:1 |
| | 0.070 | 25 | 4¼ | 0.34 | 60 | 1:1.5 |
| | 55% solids: | | | | | |
| | 0.0595 | 100–150 | 4.25 | 0.20 | 61 | |
| | 0.0595 | 100–150 | 4.25 | 0.23 | 65 | |
| | 0.0595 | 125 | 4.5 | 0.22 | | |
| E | 60% solids: | | | | | |
| | 0.0595 | 175 | 4 | 0.20 | 48 | 1:2.1 |
| | 0.0595 | 150 | 4 | 0.21 | 19 | 1:4.1 |
| | 0.0595 | 150 | 4 | 0.21 | 82 | |
| | 0.042 | 150 | 4 | 0.35 | 59 | 1:4 |

The Agtron color test is based on the light reflection principle wherein the percentage of 640 millimicron light reflected by the sample as measured on the Agtron Model F Color Meter, manufactured by Magnuson Engineers, Inc., San Jose, Calif. This color meter includes a gas discharge tube light source for illuminating the sample, filters for isolating a selected monochromatic line of the light source, a phototube, and an electronic amplifier for measuring the reflected monochromatic illumination. The color measurement is made by placing a sample cup containing the product in a recessed opening at the top of the instrument and measuring the product's monochromatic reflectance. The instrument is previously calibrated by special standard reflectance surfaces in order that the reflectance of the sample can be compared with known reflectance levels. The instrument's numerical reading a function of a monochromatic reflectance comparison of the sample and the reference material. Two different reference surfaces are used to calibrate the instrument. One of these has somewhat less reflectance than the darkest sample to be measured, and the other has a little more reflectance than the lighest sample. By means of separate controls the instrument is calibrated so that it read "0" on the lighter surface (#5023.5 plate) and "100" on the darker surface (#5007 plate). In this way, the range of color difference encountered in the product can be spread over the full 100 points of the meter scale to provide a wide spread of readings between the various sample of products. Accordingly, the ratings are relative, the range of 72–75 being approximately that for commercial, ground, roast coffee.

Figure 6:
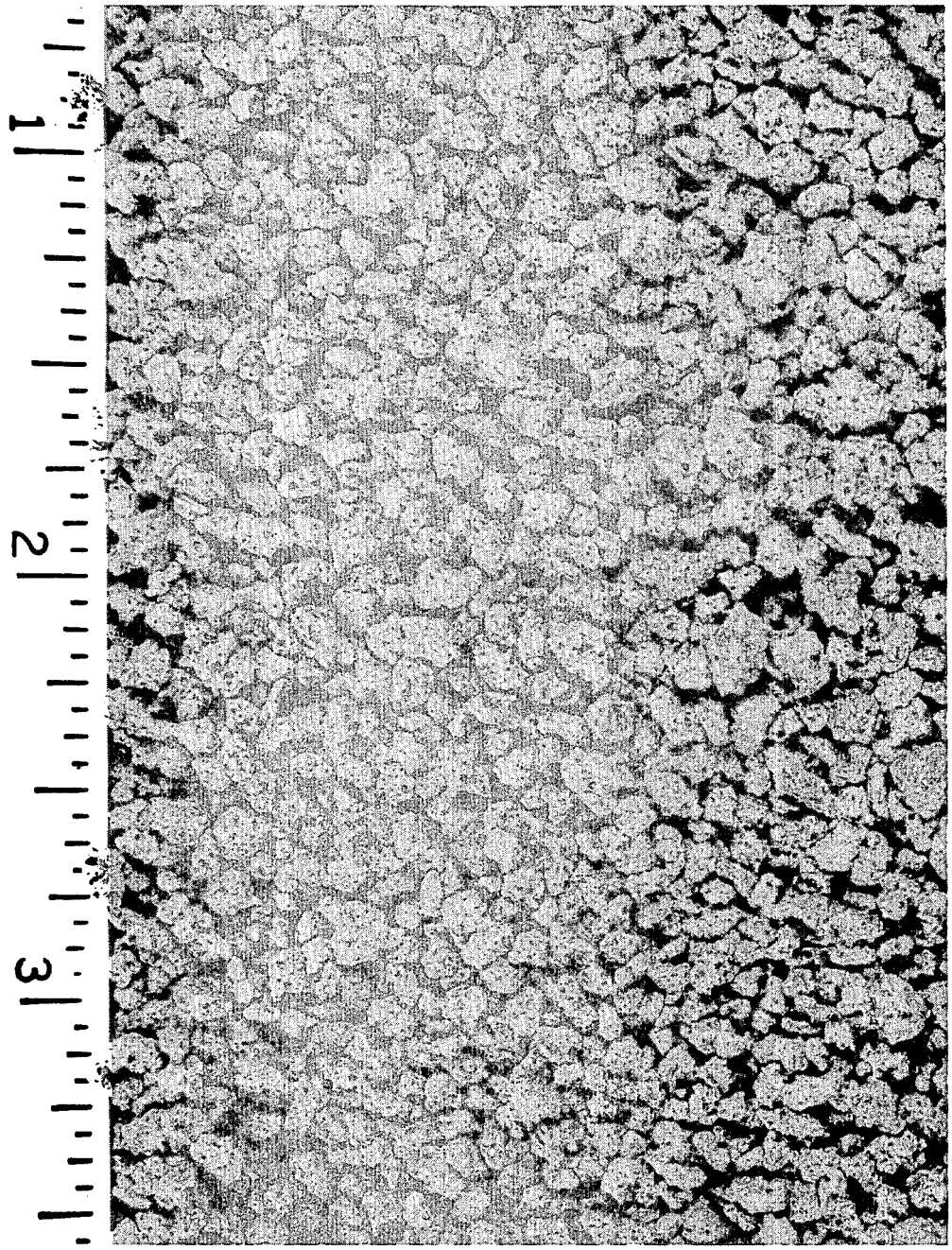
FIGS. 6, 7 and 8 are reproductions of photomicrographs showing products as herein described, FIG. 6 being a photomicrograph of the product of the present invention.
Figure 7:
Figure 8:
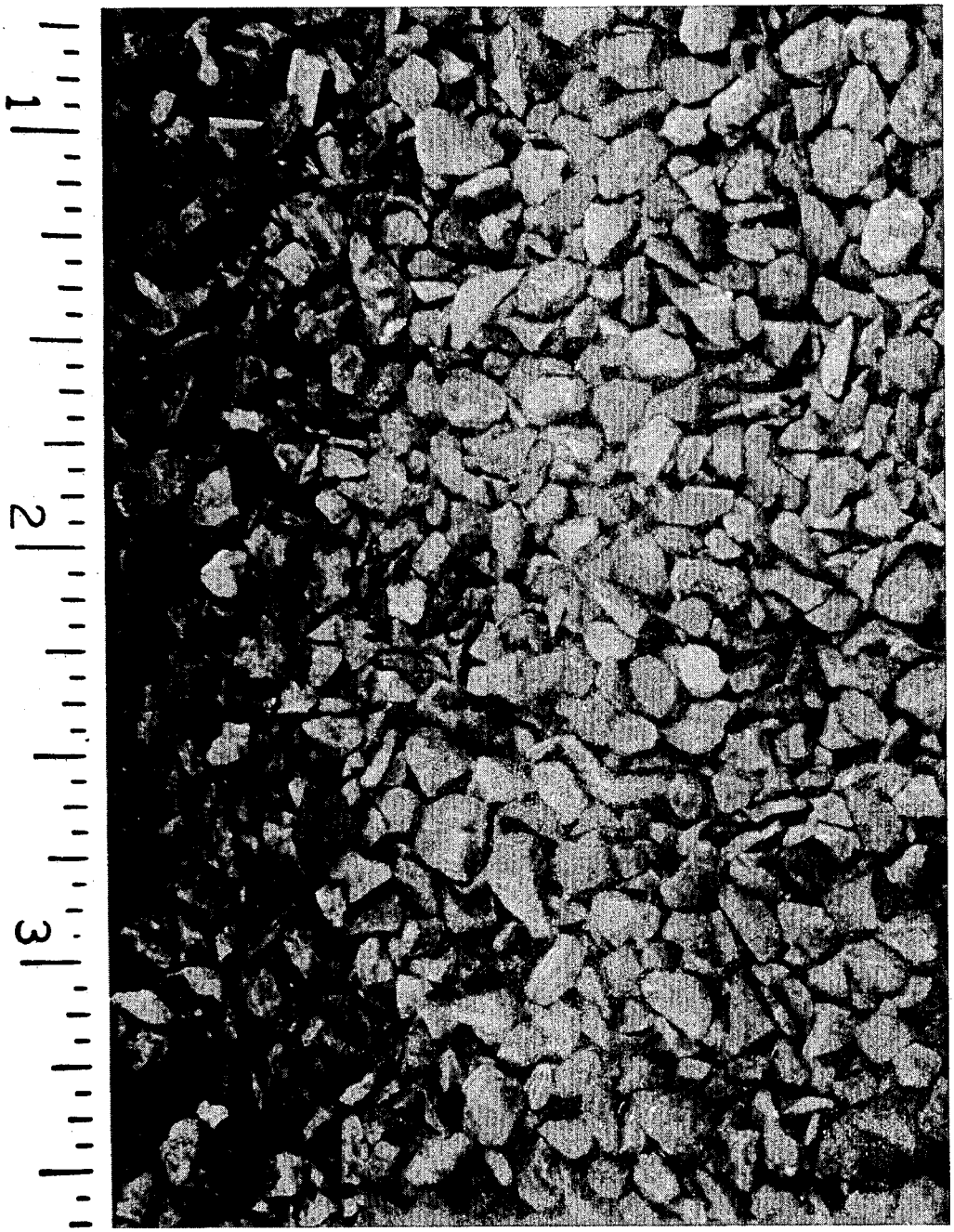

FIGS. 6, 7 and 8 compare some of the characteristics of the products of the present invention with conventional products. The scale of the photographs indicated thereon by a ruler lined in inches and fractions thereof. FIG. 7 shows a slab frozen product produced by conventional techniques in which a slab of concentrate is poured and frozen after which it is subdivided into fragments for freeze-drying. FIG. 8 is a photomicrograph of a commercially available freeze-dried coffee product sold under the trade name Maxim and produced by General Foods Corporation.

In contrast, FIG. 6 is a photomicrograph of the product of the present invention and illustrates the distinct physical properties that it possesses. Thus, the product of the present invention appears as substantially porous particles having a large number of pores or voids of varying sizes, the pores or voids consisting of minute open channels throughout the solid structure of the particles. Furthermore, the product has a generally granular form of sponge-like or lava-like appearance and structure as distinguished from the angular flat-walled rock-like solid conformation of the products shown in FIGS. 7 and 8.

While the exact reasoning underlying the unusual physical properties of the structure shown of the invention as shown in FIG. 6 is not completely understood, it is believed to result directly from the inability of crystal growth to occur during the shock freezing operation. Thus, the freezing operation is carried out in such an instant and minute scale that crystal growth is probably prevented. Accordingly, when the small ice crystals are sublimated in the later freeze drying operation, they leave behind a structure which is highly porous due to the small size of the original ice crystals. In this way, shock freezing accounts for the low bulk density of the products of the invention. It is also probable that the porosity of the structure is highly interconnected which accounts for the readiness with which the product disperses into water. By experiment, it is easily shown that the product as shown in FIG. 6 instantly disperses in either hot or cold water. In fact, so rapid does it disperse, even in cold water, that stirring is almost unnecessary.

FIG. 9 illustrates an amplified flow sheet for preparing commercial instant coffee product which is permitted because of the high solids concentration which can be utilized in the method of the present invention. In general, the process consists of utilizing a high quality coffee which is freeze concentrated to form one component of the extract concentrate. The other portion of the extract concentrate is made from a lower quality coffee which may be evaporatively concentrated to a higher solids content than is commonly achieved with freeze concentration. Normally, the volatiles lost in evaporative concentration represent loss of desirable constituents but in the case of somewhat lower quality coffees, the loss of such volatiles may well be an improvement. More specifically, referring to the flow sheet, roast coffee of high quality, labeled A, is processed through typical milling, extraction and freeze concentration steps 70–72. The volatiles that are evolved in these steps are captured in step 73 as by extracting the atmosphere from the stations performing these operations and passing the same through a cold trap. Other flavor and aroma volatiles may be supplied as desired. These constituents are held out of the process until the dried product has been developed.

In a separate operation, roast coffee of somewhat lower quality labeled B, is subject to milling extraction and evaporative concentration operations 74–76 to a solids content higher than about 25%. The coffee concentrates from A coffee and B coffee are then mixed in step 77 to the desired solids concentration which may range anywhere from 20 to 60% so as to be suitable for the spray freezing operation previously described herein. The solids concentrate is then sprayed into drops in step 78 and passed in step 79 through a low temperature chill zone to shock freeze the drops into discrete frozen particles in the manner described. A suitable liquid cryogen is sprayed in step 80 to create the low temperature zone. The frozen particles are collected and freeze-dried in step 81 to sublimate their ice content and the resulting product may be directly used as a dried coffee extract product or ground in step 82 to separate the discrete particles that have agglomerated to assure that the dried product has a size less than that which will pass through #10 mesh screen.

It has been discovered that the structure of the freeze-dried product of the present invention has an extraordinarily high affinity for sorbing volatile flavor and aroma constituents. Accordingly, the dried product may be contacted in step 83 with the volatile constituents which were previously collected and aromatized by sorbing such volatiles. The resultant product attains a very high quality being particularly rich in the desired aroma and flavor constituents.

We claim:
1. In a method for preparing freeze-dried coffee extract particles having low density from a concentrate of coffee extract, the steps of spraying said concentrate to form drops spraying a liquefied cryogen downwardly into a region to form a low temperature zone for freezing said drops, permitting said drops to fall freely through said region causing said drops to impinge and pass through said low temperature zone wherein they are instantly shock frozen into discrete solid frozen particles, collecting the particles and freeze-drying them to sublimate the ice content thereof and form a dried particle product.

2. A method for preparing freeze-dried coffee extract particles as in claim 1 wherein said liquefied cryogen gas is tangentially sprayed.

3. A method for preparing freeze-dried coffee extract particles as in claim 1 including the step of grinding the dried particle product to separate into discrete particles any of the product that have agglomerated.

4. A method for preparing freeze-dried coffee extract particles as in claim 1 wherein said concentrate is supplied in a solids concentration of about 40–60%.

5. A method for preparing freeze-dried coffee extract particles comprising preparing a first coffee concentrate by freeze concentrating an aqueous extract of coffee, preparing a second concentrate by evaporatively concentrating an aqueous extract of coffee, said first concentrate having a solids concentration of less than about 25% and said second concentrate having a solids content greater than about 25%, mixing said first and second concentrates to a solids concentration in the range of from 25 to 60%, spraying said mixed concentrate of said last step to form drops, spraying a liquefied cryogen gas downwardly into a region to form a low temperature zone for freezing said drops, permitting said drops to fall freely through said region to cause said drops to impinge and pass through said low temperature zone wherein they are instantly shock frozen into discrete solid particles, collecting the particles and freeze drying them to sublimate the ice content thereof and to form a resultant dry particle product.

6. A method as in claim 5 wherein the volatiles escaping from the preparation of the aqueous extract are collected and further including the step of contacting the dried particle product with said volatiles to aromatize the flavor the same.

7. The method as in claim 5 wherein said first concentrate is prepared from high quality coffees and said second concentrate is prepared from lower quality coffees.

References Cited
UNITED STATES PATENTS

| | | | |
|---|---|---|---|
| 2,751,687 | 6/1956 | Colton | 99—71X |
| 2,788,276 | 4/1957 | Reich et al. | 99—71 |
| 2,863,774 | 12/1958 | Bonotto | 99—71 |
| 3,290,788 | 12/1966 | Seelandt | 34—5 |
| 3,418,134 | 12/1968 | Rooker | 99—71X |
| 3,431,655 | 3/1969 | Grover et al. | 34—5 |

FRANK W. LUTTER, Primary Examiner
W. L. MENTLIK, Assistant Examiner

U.S. Cl. X.R.
62—347